Dec. 5, 1944.    C. H. HUNSAKER    2,364,144
THERMALLY REGULATED ENCLOSURE FOR ELECTRICAL EQUIPMENT
Filed Jan. 29, 1942    2 Sheets-Sheet 1
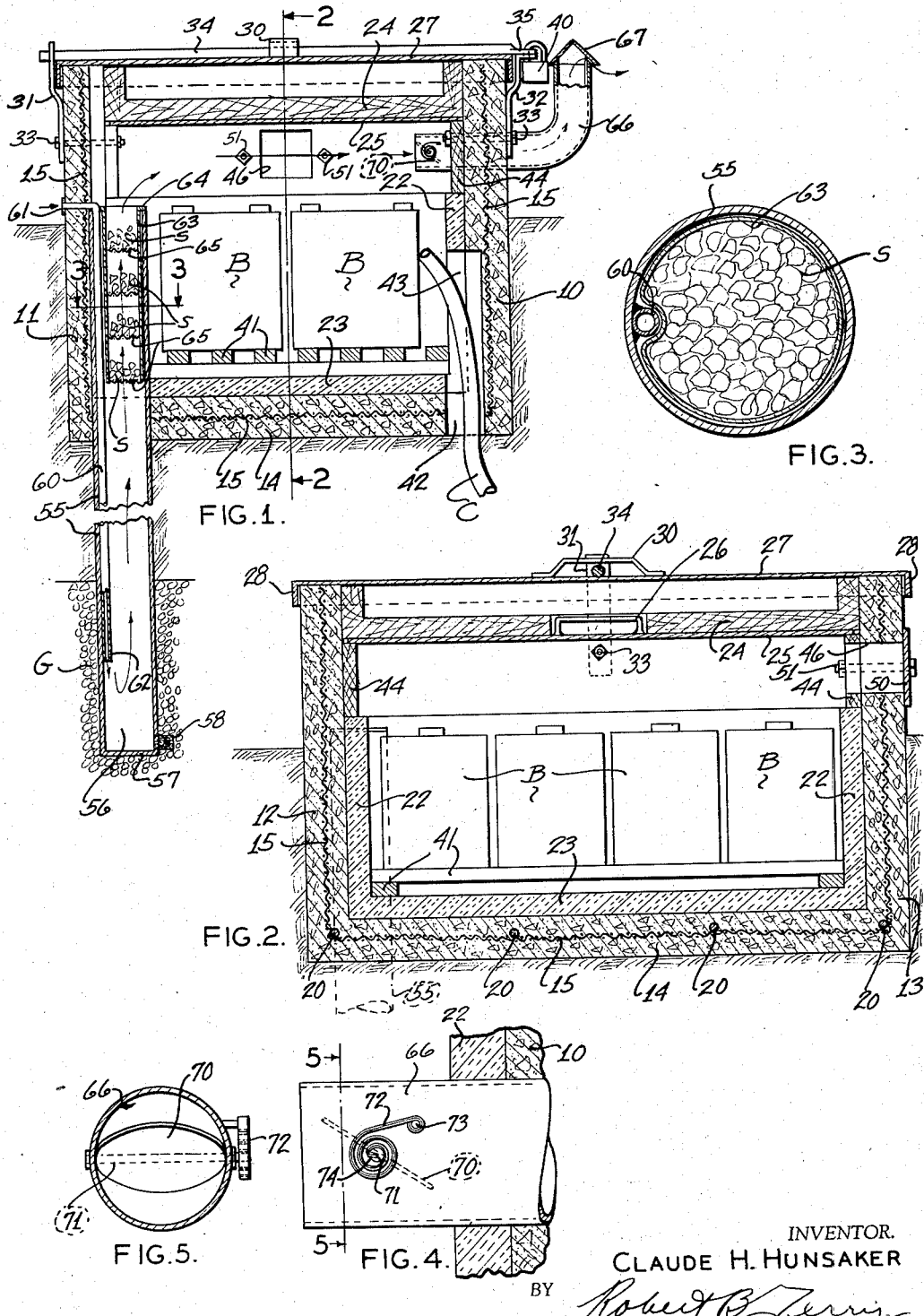
INVENTOR.
CLAUDE H. HUNSAKER
BY
ATTORNEY Dec. 5, 1944.  C. H. HUNSAKER  2,364,144
THERMALLY REGULATED ENCLOSURE FOR ELECTRICAL EQUIPMENT
Filed Jan. 29, 1942  2 Sheets-Sheet 2
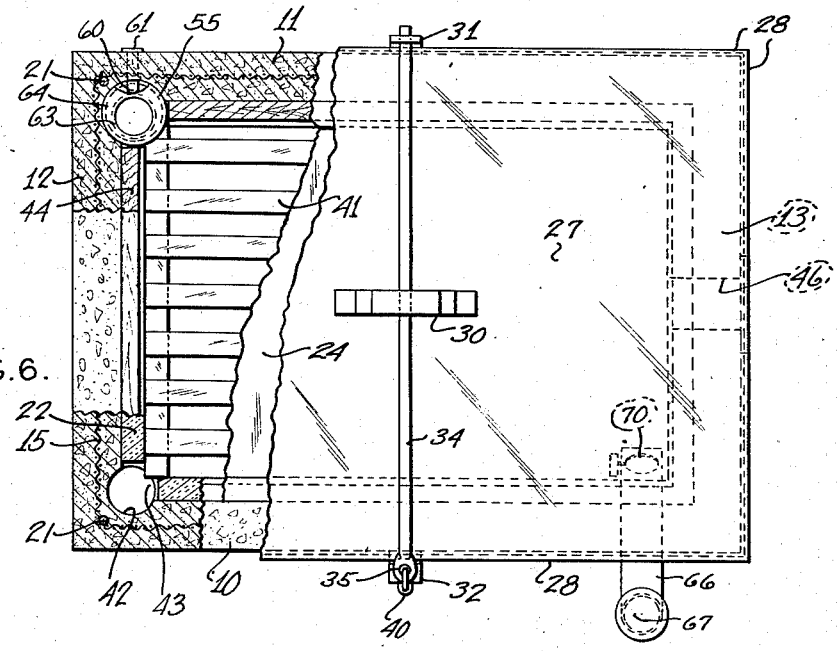
INVENTOR.
CLAUDE H. HUNSAKER
BY Robert B. Terry
ATTORNEY Patented Dec. 5, 1944

2,364,144

UNITED STATES PATENT OFFICE 2,364,144

THERMALLY REGULATED ENCLOSURE FOR ELECTRICAL EQUIPMENT

Claude H. Hunsaker, University City, Mo.

Application January 29, 1942, Serial No. 428,742

2 Claims. (Cl. 98—32)

This invention relates to thermally regulated enclosures for electrical equipment, and more particularly to an improved arrangement and method for stabilizing the temperature of thermally-sensitive electrical apparatus; the invention is particularly adapted for use in maintaining, within reasonably close limits, the temperature of housings for secondary batteries and the like such as used in connection with railway signal equipment. The invention further includes, in important part, improved features of construction of housings for batteries or the like, particularly in outdoor installations.

Due to the wide range of ambient temperatures in most parts of the United States, and due also to high moisture conditions and the destructive effects of acid fumes from secondary batteries, the economical and efficient housing and temperature maintenance of secondary batteries, has heretofore been a major source of maintenance expense, particularly in the colder regions of the country. It is accordingly a principal object of the invention to provide automatic means for warming the interior of battery boxes or the like, in the types of service mentioned, without necessarily adding any maintenance expense incident to the heating facilities.

Yet another object of the invention is attained in an improved combined arrangement for ventilating and regulating the temperature of the atmosphere adjacent a battery of secondary cells or accumulators in outdoor installations.

Another object of the invention, akin to those heretofore stated, is attained in an improved terranean installation of enclosing, ventilating and thermal regulating equipment, utilizing air subjected to the relatively even subterranean temperatures in the region of the battery installation, as the agency for thermal stabilization of the equipment.

A still further object of the invention, stated in reference to construction of the battery box or housing per se, is attained in an improved rigid, practically permanent enclosure for batteries or other equipment for outdoor installations in connection with signal and like apparatus.

Yet another object of the invention is attained in an improved arrangement for controlling a source of warming or cooling air for the purposes noted, in response to changes in a condition of the ambient air, such as the temperature thereof.

An additional object of the invention is attained in a combination of agencies for ventilating and stabilizing the temperature of batteries of secondary cells, which lends itself admirably to use, where desired, in existing signal equipment, for example, in connection with the prevailing types of instrument cases or signal stands.

The foregoing and numerous other objects will be more readily apparent from the following detailed description of certain presently preferred embodiments of the invention, as considered in connection with the accompanying drawings, in which:

Fig. 1 is a vertical sectional elevation of a terranean battery installation showing the construction of a concrete battery housing or box, and the agencies utilized therewith, for effecting an automatically controlled circulation of temperature stabilizing air, to and through the battery enclosure; Fig. 2 is a somewhat enlarged transverse section as taken through the assembly of Fig. 1 and as viewed along line 2—2 thereof; Fig. 3 is an enlarged fragmentary horizontal section particularly showing certain of the air supply features and as viewed along line 3—3 of Fig. 1; Fig. 4 is an elevational detail of a thermostatically controlled damper for regulating or modulating the flow of air through the battery enclosure; Fig. 5 is a transverse sectional elevation of the structure of Fig. 4, as viewed along line 5—5 thereof; Fig. 6 is a top or plan view, partly broken away and partly in section, of the battery box; Fig. 7 is a vertical sectional elevation of a somewhat modified installation when used in connection with an existing type of signal instrument case, and Fig. 8 is a staggered horizontal section of the modification of Fig. 7, as viewed along line 8—8 thereof.

Referring now by characters of reference to the drawings, Fig. 1 and related showings illustrate a typical terranean installation of battery box equipped with the present improvements. The term "terranean" as used in the present description and in the claims, is selected to denote generically, those installations which are of outdoor type and either partly or wholly in, or upon the earth, as at ground level. The term accordingly shall not be understood as restricted to, although including, installations wherein the enclosure for the battery or other electrical equipment is wholly or partly below ground level.

The battery box or housing proper comprises a pair of end walls 10 and 11, side walls 12 and 13 together with a bottom portion 14. The parts numbered 11 through 14 inclusive, are by preference, although not necessary in keeping with some of the principles of the invention in its broader aspect, formed of molded concrete construction, preferably monolithic in nature. The parts of the box thus far enumerated are preferably of concrete poured in suitable permanent or temporary forms of any suitable type. For the purpose of reinforcement to assure structural integrity and obviate any cracking tendencies, the sides, end and bottom elements of the box are preferably reinforced each intermediate of its thickness with a wire mesh or screen indicated at 15. While any of a variety of reticulate materials may be employed, it is preferred in most moderate size installations to employ a number 068 mesh screen as a reinforcement in each of the parts enumerated.

Additional structural reinforcement is provided, by preference in the form of tie-rods or reinforcing elements, there being four such horizontal elements in the bottom structure of the box and indicated at 20. The effect of these is supplemented by vertical corner rods 21 which may be provided in any suitable number, but preferably at least one vertical rod in each corner of the box structure and one in an intermediate portion of each side. The purpose and effect of these will be obvious to those acquainted with the concrete arts.

It is greatly preferred to provide a reasonably thick and durable lining of thermal insulation on the inner surfaces of each of the end and side elements of the concrete box as well as across the bottom thereof. These lining elements are indicated as to vertical portions, at 22 and the horizontal sheet of lining material shown at 23 across the bottom 14 of the box. A bitumastic adhesive material (not shown), may be utilized to retain the layers of insulation in place on the various internal surfaces of the box.

Recessed somewhat below the upper margins of the box proper, is a structure designated as a frost board and constituting an inner closure for the chambered portion of the box. This structure is indicated generally at 24, and may be formed as desired of wood or concrete, and preferably provided with a bottom surface 25 consisting of sheet metal. If desired, this surface may also be provided with a layer of insulation (not shown). The frost board 24 is provided with a central recess into which projects a lifting handle 26. Suitable projections, not necessary to be described in detail, form abutments or seating ledges for the frost board 24.

While many suitable forms of thermal insulation are available, it has been found that, for economy coupled with a high thermal insulating efficiency, a layer of hairfelt say 1½" in thickness, serves adequately as a lining for the wall and bottom elements of the box, and also is preferably applied to the frostboard when utilized. An outside auxiliary cover 27 is conveniently formed of a relatively heavy gauge sheet metal provided with external flanges 28 which peripherally engage the outer portions of the wall elements of the box whereby to position the cover thereon. A central handle 30 conduces to ease of lifting of the cover 27.

To provide for effective securement of the outer cover 27 in position on the box, and where desired, to lock the cover in place, a pair or more of strap elements such as 31 and 32 are provided. These are secured as by bolts 33 extending through the adjacent side walls of the box. The element 31 projects vertically above the cover 27 and is provided with an eye (not shown) for the reception of a locking bar 34. The bar 34 is provided, as will appear from Fig. 6, with an eye-forming end 35. The adjacent portion of the strap 32 is bent horizontally and is apertured in register with the opening in portion 35 so that these portions of members 32 and 34 coact to form a hasp, and the apertures therein serve to receive the U-shaped locking arm of a padlock or the like 40.

Returning again to certain of the portions located interiorly of the box, there is provided as a support for the batteries B or other equipment, a removable false bottom or support, resting upon the element 14 of the housing or box. The false bottom is indicated in part, by the numeral 41 and is, for low cost, ease of replacement and adequacy of support, preferably of slat construction made after the manner of duckboards or the like.

As an entrance passage or port for electrical cable or the like such as the usual parkway cable, for example, there is provided at one corner of the box, a cable conduit portion, extending only over a portion of the height of the box, and indicated at 42. This leads to a cable entrance port 43 directed through one of the walls of the box, the opening 43 being of a size to permit the easy insertion therein of the cable C. Mounted at a suitable height within the box, there may be provided a terminal board 44. There is provided in the opposite end of the box, an opening which may be desired in certain installations, and designated at 46. Openings 43 and 46 and passage 42, are preferably cored in at the time of forming the box, and if, for example, one of the openings, say 46 is not desired for immediate use, an outlet cover or cap 50 may be provided, and secured in place as by a bolt 51.

It is a preference as a protection against moisture absorption and penetration of ground water, that all exposed outer surfaces or at least those of the box or housing below ground level, be coated with a bitumastic waterproofing compound, a number of which are suitable and, of themselves, readily available and well known in the trade. It is a further preference that the metal elements within the box, be coated, say with asphaltum paint or a similar moisture-resisting coating and that all of the wood work be well coated, and to the fullest extent possible impregnated with a bitumastic waterproofing material such as asphaltum paint.

Proceeding now to a description of the means for and method of thermally stabilizing or normalizing the air within the box or battery housing when in use, it will be understood that one of the most useful applications of the selected embodiment is in connection with outdoor electrical equipment, for example, secondary batteries, which are thermally sensitive. It is well known among large users of batteries of this type, as in railway signal systems, that so-called storage batteries function only at a relatively low efficiency at subnormal temperatures. Even temperatures below freezing having a marked effect on the discharge rate and other characteristics of battery operation. Accordingly the present invention is particularly adapted for attaining a warming effect, during the winter season, of the air within the equipment enclosure. It has often heretofore been the practice of many of the leading railroads in connection with signal maintenance work, to place kerosene lanterns, and in some cases to provide electrical heating equipment in battery enclosures, during the coldest portion of the winter season. Obviously this requires considerable detailed personal attention as well as high expense, and in the case of electrical heating, a large consumption of the battery output solely for the purpose of heating the battery enclosures. In the present system, it has been demonstrated that the more nearly normal temperature below the surface of the earth may be utilized for stabilizing or normalizing the temperature of air about the thermally sensitive equipment. This is accomplished in the present example by providing a source of air at a substantial, yet only reasonable, depth below the surface of the earth.

In the form illustrated there is molded into the battery housing, preferably in one corner thereof, a section of pipe or casing indicated at 55, and constituting an air well. This is disposed vertically, and if desired through suitable couplings (not shown) is extended to a depth in the earth such that the zone 56 in the lower portion of the casing is maintained at a substantially uniform year-round temperature, say of the order of 50 to 56 degrees F. The casing 55 extends vertically to a zone at substantially the height of the batteries B, its upper or outer end being open, and its lower end closed by a cap or the like 57. It is a preference to surround the lower end of the pipe or casing 55, with a bed of gravel G which aids in positioning the lower end of the casing, and prevents direct contact of earth therewith. To provide for frequent drainage of any condensate from the casing, and yet prevent the entrance of any ground water, there is provided a non-return valve 58, arranged to discharge into the bed of gravel G.

It will have appeared that the casing 55 constitutes with the battery box or housing, together with an outlet passage to be described, a flue system the effective length of which is the vertical distance between the zone 56, and the end of the outlet or discharge conduit.

Inasmuch as the air is directed in colder weather substantially in accordance with recognized thermo-siphonic principles of air movement and circulation, it becomes necessary to replenish air to the zone 56, as the air moves outwardly therefrom. This is accomplished in the present instance by a small air supply pipe indicated generally at 60, having its intake end at 61. The end portion 61 is located in the poured concrete at the time of forming up the housing, and from a point just interiorly of the wall 11, the tube 60 extends downwardly substantially the full length of the conduit or casing 55, the discharge end 62 of pipe 61 being located slightly above the bottom 57 of the casing.

Since, during many seasons of the year, the outside air may carry substantial quantities of moisture, in order to minimize condensation of the air-carried dampness within the battery box, there is provided a dehumidifying, desiccating or drying agency consisting of a wire basket 63 (Figs. 1 and 3). This is by preference of circular transverse section formed up of a copper mesh or screen of somewhat less diameter than the inner diameter of casing 55, so as to fit easily within the upper portion of the air well, the upper margin of the basket 63 being provided with flanges 64 resting upon the upper margin of the air well casing 55. It will thus appear that, upon removing the cover 27 and the frostboard 24 from the battery box, the wire basket containing the dehydrating material may be readily removed from and reapplied to the upper zone of the air well identified with casing 55. It may be noted that the shaping or diameter of basket 63 is such that the latter will clear the air supply tube 61.

Any one of a number of dehydrating materials may be employed in the basket 63. The latter includes as a support for such material a series, shown as four, of horizontal shelves also formed of wire mesh and indicated at 65. These shelves serve to support the dehydrating material indicated at S, and which may consist of silica gel, calcium chloride or of other materials having suitable moisture-absorbing properties.

The outer portion of the flue system is constituted in the present example, by a right angle pipe or tube indicated generally at 66, and including a horizontal portion extending through the end wall 10 of the box, preferably at the corner thereof diagonally opposite the corner into which extends the casing 55. The horizontal portion of the outlet or discharge flue 66 extends into an elbow portion thence into a vertical or riser portion provided with a cover 67.

Since the desired extent of circulation of air from the zone 56 is dependent upon the outside temperature, it has been found conducive to best stabilization of temperature within the battery enclosure, to provide some portion of the flue system, preferably the pipe 66, with a valve, damper or throttle, whereby the effective cross section of pipe 66 may be varied. This may, if desired for simplicity and low cost, be manually regulated, although for preferred automatic regulation, a modulating control of the damper, indicated at 70, is attained by connecting a thermostat to the shaft 71 for the damper. In the simplest form, a bi-metallic thermostatic element 72 is located exteriorly of a portion of the pipe 66 (see Fig. 4). One end of the thermostatic element is anchored to the pipe as at 73 and the inner end of the spiral portion 74 of the thermostatic element, engages and rockably actuates the damper shaft 71. Other more elaborate systems of thermostatic control are available to the trade and are contemplated as susceptible of utilization to the extent permitted by permissive costs.

It is a preference, although not strictly necessary to the operativeness of the arrangement described, that the damper 70 be precluded, as by its own diameter, from fully closing the passage through discharge stack or tube 66; this suggestion is made in order to insure a continuous, even though in some cases a very slight, circulation of air through the system as is advisable for ventilation purposes due to occasional gassing effects of the batteries. Continuous removal of the gases from the enclosure provided by the box, makes for a minimization of damage from acid battery fumes and the like, and the drying of the air entering the enclosure further tends to minimize damage from gaseous fumes and the like normally emanated by the secondary cells, particularly when the latter are of the usual lead and acid type.

From the foregoing description it now becomes readily apparent that the method and practice involved in maintaining temperature within the battery box within much closer limits than were the battery subjected at all times to ambient temperature, consists in the preferably continuous cooling or warming of a supply of outside air in a subterranean zone, and the movement of such air across and adjacent to the bank of cells in the enclosure, thence outwardly to atmosphere in a zone remote from the point of air entry. The placing of the inlet and outlet at remote portions of the battery box minimizes the possibility, in still air, of recirculating any of the air already charged with fumes or theretofore affected in temperature by prior circulation.

A somewhat modified arrangement, although the same in principle as heretofore described, is seen by particular reference to Figs. 7 and 8, wherein the heat-regulating expedients are installed in connection with existing signal equipment. In this arrangement the usual signal case or instrument case is indicated at 80, and is divided into an upper compartment 81 and a lower compartment 82, the batteries B being housed in the lower compartment. The provision for maintaining circulation of thermally stabilized air from a subterranean source through the compartment 82 is identical with the principle heretofore described. In this case a tube or casing 83 extends to a zone 84 substantially below the level E of the earth, thence through a concrete base 85 for the instrument casing. The base 85 may be of solid monolithic concrete construction, of tubular sectional construction, or of any other suitable form. A relatively small copper tube 86 is or may be identical with tube 60 heretofore described, and a basket for dehydrating material indicated generally at 87 may be the same as that shown at 63 in Figs. 1 and 3.

In the instrument case installation, since the compartments 81 and 82 freely communicate with each other, the established course of flow and method of utilization are the same as heretofore described, the current of air from the zone 84 proceeding upwardly through casing 83, into compartments 82 and 81 in order, thence outwardly through the discharge pipe 90. The latter is by preference also provided with a thermostatic control indicated generally at 91 and serving a purpose identical to the thermostat 72, best shown in Fig. 4. In the modified form utilized with battery installations in instrument cases or the like, the arrangement is also preferably such that the air well identified here with casing 83 and the discharge pipe, here indicated at 90, are located at diagonally opposite corners of the enclosure. In the event a circular housing is employed, whether in the form of a specific battery box or otherwise, the elements 83 and 90 would, by preference, be located at diametrally opposite portions.

It will have appeared that the arrangements described as embodiments of the invention will serve fully and adequately to provide a low cost automatic ventilating and temperature-stabilizing agency for outdoor installations of electrical or other thermally sensitive equipment, one example of which is found in the widespread practice of installing batteries for railway signal equipment, in outdoor enclosures and either upon or slightly below the surface of the earth. It will have appeared that the described arrangement and method of utilizing the elements and arrangements described, serve fully to attain each of the objects above specifically stated, as well as the many other advantages implied from description of parts and method of usage.

Although the invention has been disclosed by making detailed reference to certain preferred embodiments, the detail of description is to be understood solely in an instructive and not in a limiting sense, many changes being possible within the scope of the claims hereto appended.

I claim as my invention:

1. A natural draft system for ventilating and thermally stabilizing enclosed outdoor electrical equipment such as secondary batteries, the system including a rectangular battery box and batteries therein, the box being located near the surface of the earth, a support for the batteries within the box, and being of such form as to permit free circulation of air around, as well as above and below the batteries in the box, a lining of insulation material in the box, a vertical casing constituting an air well which extends from about the height of the batteries downwardly through one corner of the box and therebelow to a subterranean zone at a substantial depth below the box, a valved condensate outlet fitting located in the lower portion of the said air well casing, an air replacement pipe having its inlet end in a zone exteriorly of the box and above ground level, thence extending into the box, downwardly through a portion of the box and within the air well casing to a point somewhat above the bottom of the casing, an air discharge pipe extending outwardly of the space within the box, and from a corner thereof diagonally opposite the zone of the air well, a damper in the discharge pipe, a thermostat disposed within the box so as to be responsive to temperature conditions therein, and directly operatively connected with the damper, and a receptacle containing a dehydrating material, supported within the air well casing and in a position to enable removal of the receptacle and replacement thereof, through the outlet opening of the well casing.

2. A natural draft system for ventilating and thermally stabilizing enclosed outdoor electrical equipment such as secondary batteries, the system including a molded concrete battery box and batteries therein, the box being located near the surface of the earth, a support for the batteries within the box, and being of such form and so arranged as to permit free circulation of air around, as well as above and below the batteries in the box, a lining of insulation material in the box, a vertical casing constituting an air well, and including a portion molded in the bottom of the box, the casing extending downwardly from about the height of the batteries thence through one corner of the box and downwardly therefrom to a subterranean zone at a substantial depth below the box, a condensate outlet fitting including an outwardly-opening check valve located in the lower portion of the air well casing, an air replacement pipe having its inlet end in a zone exteriorly of the box and above ground level, thence directed inwardly of the box, being molded in a wall thereof, and further extending downwardly through a portion of the box and within the air well casing to a point within but somewhat above the bottom of the casing, an air discharge pipe extending outwardly of the space within the box, and from a corner thereof diagonally opposite the zone of the air well casing, the discharge pipe including a horizontal portion molded in and projecting through one of the side walls of the box, a damper in the discharge pipe, a thermostat disposed within the box so as to be responsive to temperature conditions therein, and directly operatively connected with the damper, and a receptacle containing a dehydrating material, supported within the air well casing, but in a position to enable removal of the receptacle and replacement thereof, through the outlet opening of the well casing.

CLAUDE H. HUNSAKER.